(12) United States Patent
Li et al.

(10) Patent No.: US 10,384,162 B2
(45) Date of Patent: *Aug. 20, 2019

(54) HIGH SILICA CHABAZITE FOR SELECTIVE CATALYTIC REDUCTION, METHODS OF MAKING AND USING SAME

(75) Inventors: Hong-Xin Li, Lansdale, PA (US); William E. Cormier, Harleysville, PA (US); Bjorn Moden, Glen Mills, PA (US)

(73) Assignee: PQ Corporation, Valley Forge, PA (US)

( * ) Notice: Subject to any disclaimer, the term of this patent is extended or adjusted under 35 U.S.C. 154(b) by 1532 days.

This patent is subject to a terminal disclaimer.

(21) Appl. No.: 12/641,201

(22) Filed: Dec. 17, 2009

(65) Prior Publication Data

US 2010/0092362 A1 Apr. 15, 2010

Related U.S. Application Data

(63) Continuation-in-part of application No. 12/055,639, filed on Mar. 26, 2008, now Pat. No. 7,645,718.

(60) Provisional application No. 60/907,206, filed on Mar. 26, 2007.

(51) Int. Cl.
| | | |
|---|---|---|
| B01J 29/06 | (2006.01) |
| B01D 53/94 | (2006.01) |
| B01J 37/10 | (2006.01) |
| B01J 37/02 | (2006.01) |
| B01J 29/70 | (2006.01) |
| B01J 29/76 | (2006.01) |
| B01J 29/85 | (2006.01) |
| B01J 35/00 | (2006.01) |
| B01J 35/02 | (2006.01) |
| B01J 35/10 | (2006.01) |

(52) U.S. Cl.
CPC ...... B01D 53/9418 (2013.01); B01J 29/7015 (2013.01); B01J 29/763 (2013.01); B01J 29/85 (2013.01); B01J 35/002 (2013.01); B01J 35/023 (2013.01); B01J 35/1023 (2013.01); B01J 35/1038 (2013.01); B01J 37/0201 (2013.01); B01J 37/10 (2013.01); B01D 2251/2062 (2013.01); B01D 2251/2067 (2013.01); B01D 2255/20738 (2013.01); B01D 2255/20761 (2013.01); B01D 2255/50 (2013.01); B01D 2255/92 (2013.01); B01D 2255/9205 (2013.01); B01D 2255/9207 (2013.01); B01J 2229/18 (2013.01); B01J 2229/186 (2013.01)

(58) Field of Classification Search
CPC ...... B01J 29/763; B01J 29/85; B01J 2229/18; B01J 2229/186; B01J 35/002; B01J 35/023; B01J 35/1023; B01J 35/35; B01J 35/1038; B01J 37/10; B01J 37/0201; B01D 53/9418; B01D 2251/2062; B01D 2251/2067; B01D 2255/50; B01D 2255/92; B01D 2255/9205; B01D 2255/9207

USPC ..... 502/60, 214; 423/700, 235, 239.1, 239.2
See application file for complete search history.

(56) References Cited

U.S. PATENT DOCUMENTS

| | | | |
|---|---|---|---|
| 4,440,871 A | 4/1984 | Lok et al. | |
| 4,544,538 A * | 10/1985 | Zones | 423/706 |
| 4,665,110 A * | 5/1987 | Zones | 423/706 |
| 4,867,954 A | 9/1989 | Staniulis et al. | |
| 4,874,590 A | 10/1989 | Staniulis et al. | |
| 4,961,917 A | 10/1990 | Byrne | |
| 5,026,532 A | 6/1991 | Gaffney et al. | |
| 5,233,117 A | 8/1993 | Barger | |
| 5,417,949 A | 5/1995 | McWilliams et al. | |
| 5,451,387 A | 9/1995 | Farnos et al. | |
| 5,516,497 A | 5/1996 | Speronello et al. | |
| 5,589,147 A | 12/1996 | Farnos et al. | |
| 6,689,709 B1 | 2/2004 | Tran et al. | |
| 6,709,644 B2 * | 3/2004 | Zones et al. | 423/706 |
| 6,890,501 B2 | 5/2005 | Delahay et al. | |
| 6,914,026 B2 | 7/2005 | Tran et al. | |
| 7,118,722 B2 | 10/2006 | Tran et al. | |
| 7,273,827 B2 | 9/2007 | Chang et al. | |
| 7,601,662 B2 * | 10/2009 | Bull et al. | 502/60 |
| 7,645,718 B2 | 1/2010 | Li et al. | |
| 2006/0115403 A1 * | 6/2006 | Yuen | 423/239.2 |
| 2008/0202107 A1 * | 8/2008 | Boorse et al. | 60/301 |
| 2008/0226545 A1 * | 9/2008 | Bull et al. | 423/700 |
| 2008/0241060 A1 | 10/2008 | Li et al. | |
| 2009/0196812 A1 * | 8/2009 | Bull et al. | 423/239.1 |
| 2010/0092361 A1 | 4/2010 | Li et al. | |
| 2011/0182790 A1 * | 7/2011 | Chandler et al. | 423/213.5 |
| 2011/0251048 A1 * | 10/2011 | Ariga et al. | 502/60 |

FOREIGN PATENT DOCUMENTS

| | | |
|---|---|---|
| EP | 0 396 085 | 11/1990 |
| EP | 0 624 393 | 11/1994 |

(Continued)

OTHER PUBLICATIONS

Ishihara et al., "Copper Ion-Exchanged SAPO-34 as a Thermostable Catalyst for Selective Reduction of NO with C3H6", Journal of Catalysis, 169, 93-102, 1997.*

(Continued)

Primary Examiner — Elizabeth D Wood
(74) Attorney, Agent, or Firm — Finnegan, Henderson, Farabow, Garrett & Dunner LLP

(57) ABSTRACT

There is disclosed a microporous crystalline material comprising a metal containing chabazite having a crystal size greater than 0.5 microns and a silica-to-alumina ratio (SAR) greater than 15, wherein the metal containing chabazite retains at least 80% of its initial surface area and micropore volume after exposure to temperatures of up to 900° C. in the presence of up to 10 volume percent water vapor for up to 1 hour. Methods of using the disclosed crystalline material, such as in the SCR of $NO_x$ in exhaust gas are also disclosed, as are methods of making such materials.

34 Claims, 9 Drawing Sheets

(56) References Cited

FOREIGN PATENT DOCUMENTS

| EP | 1 837 489 | 9/2007 |
|---|---|---|
| WO | WO 2006/064805 | 6/2006 |
| WO | 2008/106523 A2 * | 9/2008 |

OTHER PUBLICATIONS

Ishihara et al., "Thermostable Molecular Sieves, Silicoaluminophosphate (SAPO)-34, for the removal of NOx with C3H in the Coexistence of O2, H2O and SO2", Ind. Eng. Chem. Tes., 36, 17-22, 1997.*

Majewski, "Selective Catalytic Reduction", DieselNet Technology Guide, www.DieselNet.com, Copyright Ecopoint Inc., Revision 2005.05d.*

Chen, Jiesheng et al., Silicoaluminophosphate number eighteen (SAPO-18): a new microporous solid acid catalyst, Catalysis Letters 28 (1994) 241-248.

Frache, A., "Catalytic DeNO$_x$ activity of cobalt and copper ions in microporous MeALPO-34 and MeAPSO-34," Catalysis Today 75 (2002) 359-365.

Ishihara, Tatsumi et al., "Copper Ion Exchanged Silicoaluminophosphate (SAPO) as a Thermostable Catalyst for Selective Reduction of NO$_x$ with Hydrocarbons," Studies in Surface Science and Catalysts, 84 (1994) 1493-1500.

Ishihara, Tatsumi et al., "Selective Reduction of Nitrogen Monoxide with Propane over Cu-Silico-aluminophosphate (SAPO) under Oxidizing Atmosphere," Chemistry Letters (1992) 2119-2122.

Watanabe, Yoshihide et al., "Multinuclear NMR Studies on the Thermal Stability of SAPO-34," Journal of Catalysis 143, (1993) 430-436.

International Search Report and Written Opinion dated Jul. 10, 2008.

Centi et al., "Nature of Active Species in Copper-based Catalysts and their Chemistry of Transformation of Nitrogen Oxides" *Applied Catalysis A: General*, vol. 132, pp. 179-259 (1995).

Frache et al., "NO$_x$ Reactivity on Microporous MeAPOs. Spectroscopic and Catalytic Studies", *Studies in Surface Science Catalysis*, vol. 132, pp. 5096-5104 (2001).

Ishihara et al., "Copper Ion-Exchanged SAPO-34 as a Thermostable Catalyst for Selective Reduction of NO with C3H6", Journal of Catalystis, 169, 93-102, 1997, no month.

Ishihara et al., "Thermostable Molecular Sieves, Silicoaluminophosphate (sapo)-34, for the Removal of NOx with C3H6 in the Coexistence of O2, H2O, and SO2," Ind. Eng. Chem. Tes., 36, 17-22, 1997, no month.

* cited by examiner

HIGH SILICA CHABAZITE FOR SELECTIVE CATALYTIC REDUCTION, METHODS OF MAKING AND USING SAME

This is a continuation-in-part of U.S. patent application Ser. No. 12/055,639, filed Mar. 26, 2008, now U.S. Pat. No. 7,645,718, which claims the benefit of domestic priority to U.S. Provisional Patent Application No. 60/907,206, filed Mar. 26, 2007, both of which are herein incorporated by reference in their entirety.

The present disclosure is related to hydrothermally stable microporous crystalline materials comprising a metal containing, high silica chabazite, that is able to retain a specific percentage of its surface area and micropore volume after treatment with heat and moisture. The present disclosure is also related to methods of using the disclosed high silica chabazite materials, such as in reducing contaminants in exhaust gases. Such methods include the selective catalytic reduction ("SCR") of exhaust gases contaminated with nitrogen oxides ("$NO_x$").

Microporous crystalline materials and their uses as catalysts and molecular sieve adsorbents are known in the art. Microporous crystalline materials include crystalline aluminosilicate zeolites, metal organosilicates, and aluminophosphates, among others. One catalytic use of the materials is in the SCR of $NO_x$ with ammonia in the presence of oxygen and in the conversion process of different feed stocks, such as an oxygenate to olefin reaction system.

Medium to large pore zeolites containing metals, such as ZSM-5 and Beta, are also known in the art for SCR of $NO_x$ using reductants, such as ammonia.

A class of silicon-substituted aluminophosphates, which are both crystalline and microporous and exhibit properties characteristic of both aluminosilicate zeolites and aluminophosphates, are known in the art and disclosed in U.S. Pat. No. 4,440,871. Silicoaluminophosphates (SAPOs) are synthetic materials having a three-dimensional microporous aluminophosphate crystalline framework with silicon incorporated therein. The framework structure consists of $PO_2^+$, $AlO_2^-$, and $SiO_2$ tetrahedral units. The empirical chemical composition on an anhydrous basis is:

$mR:(Si_xAl_yP_z)O_2$ wherein, R represents at least one organic templating agent present in the intracrystalline pore system; m represents the moles of R present per mole of $(Si_xAl_yP_z)O_2$ and has a value from zero to 0.3; and x, y, and z represent the mole fractions of silicon, aluminum, and phosphorous, respectively, present as tetrahedral oxides.

U.S. Pat. No. 4,961,917 discloses a method for the reduction of $NO_x$ with ammonia using a certain class of zeolite catalysts that are sulfur-tolerant, especially when the zeolites are promoted with a promoter such as iron or copper. The zeolites disclosed therein have pore diameters of at least 7 Angstroms and are selected from the groups including USY, Beta, and ZSM-20. The catalysts employed therein maintain good catalytic properties under high temperature conditions of use, from about 250-600° C.

U.S. Pat. No. 5,451,387 discloses a method for improving the reduction activity of the zeolite catalyst at temperatures below 400° C., without adversely affecting the reduction capacity above 400° C., by introducing iron into an intermediate pore size zeolite, which are identified as ZSM-5 type zeolites. U.S. Pat. No. 6,914,026 discloses an iron-promoted aluminosilicate zeolite with improved hydrothermal stability and good catalytic activity under high temperatures, e.g., 400° C. and above, in the presence of sulfur compounds. U.S. Pat. Nos. 6,689,709 and 7,118,722 disclose stabilized iron and/or copper promoted zeolite catalysts for $NO_x$ reduction, wherein the zeolites include USY, Beta, and/or ZSM-20, and have pore diameters of at least 7 Angstroms. U.S. Pat. No. 6,890,501 discloses Beta-zeolites loaded with iron for the SCR of $NO_x$ and $N_2O$ with ammonia, wherein the zeolite was prepared by ion-exchange or impregnation.

U.S. Pat. No. 5,516,497 discloses a metal-promoted zeolite catalyst and a method for the catalytic reduction of $NO_x$ with ammonia using the catalysts in stages. The first catalyst is promoted with not more than about 1% by weight of iron and/or copper promoter, and the second catalyst is promoted with more than about 1% by weight of iron and/or copper promoter. The selectivity of the catalyst, favoring either reduction of $NO_x$ or ammonia, can be tailored by controlling the content of the promoting metal. By utilizing suitable zeolite materials, high temperature gaseous streams, up to about 600° C., may be treated without seriously affecting the life or efficiency of the catalyst.

U.S. Pat. No. 6,709,644, the teachings of which are herein incorporated by reference, discloses zeolites having the crystal structure of chabazite (CHA). This reference specifically describes the benefits associated with the small crystallite size (0.5 microns or less), as well as processes using the small crystallite, including as a catalyst. Nothing in this patent, or in the prior art in general, describes the benefits associated with a metal containing zeolite having a large crystal structure of chabazite (CHA), and certainly not with the improved hydrothermal stability properties discovered by Applicants.

SUMMARY

Therefore, the present disclosure generally provides a hydrothermally stable microporous crystalline material comprising a metal containing, high-silica chabazite having a large crystal size.

In one embodiment, there is disclosed a microporous crystalline material comprising a metal containing chabazite, such as a copper chabazite, having a crystal size greater than 0.5 microns and a silica-to-alumina ratio (SAR) greater than 15, such as from 15-60, or even 20-60. In one embodiment, the metal containing chabazite retains at least 80% of its initial surface area and micropore volume after exposure to temperatures of up to 900° C. in the presence of up to 10 volume percent water vapor for up to 1 hour.

Other aspects of the present disclosure include methods of SCR of NO), in exhaust gas. One such method comprises contacting, in the presence of ammonia or urea, exhaust gas with the metal containing, high-silica chabazite described herein.

In one embodiment, the method comprises first providing an article comprising a microporous crystalline material comprising a metal containing chabazite as described herein.

Aside from the subject matter discussed above, the present disclosure includes a number of other exemplary features such as those explained hereinafter. It is to be understood that both the foregoing description and the following description are exemplary only.

BRIEF DESCRIPTION OF THE DRAWINGS

The accompanying figures are incorporated in, and constitute a part of this specification.

DEFINITIONS

Figure 1:
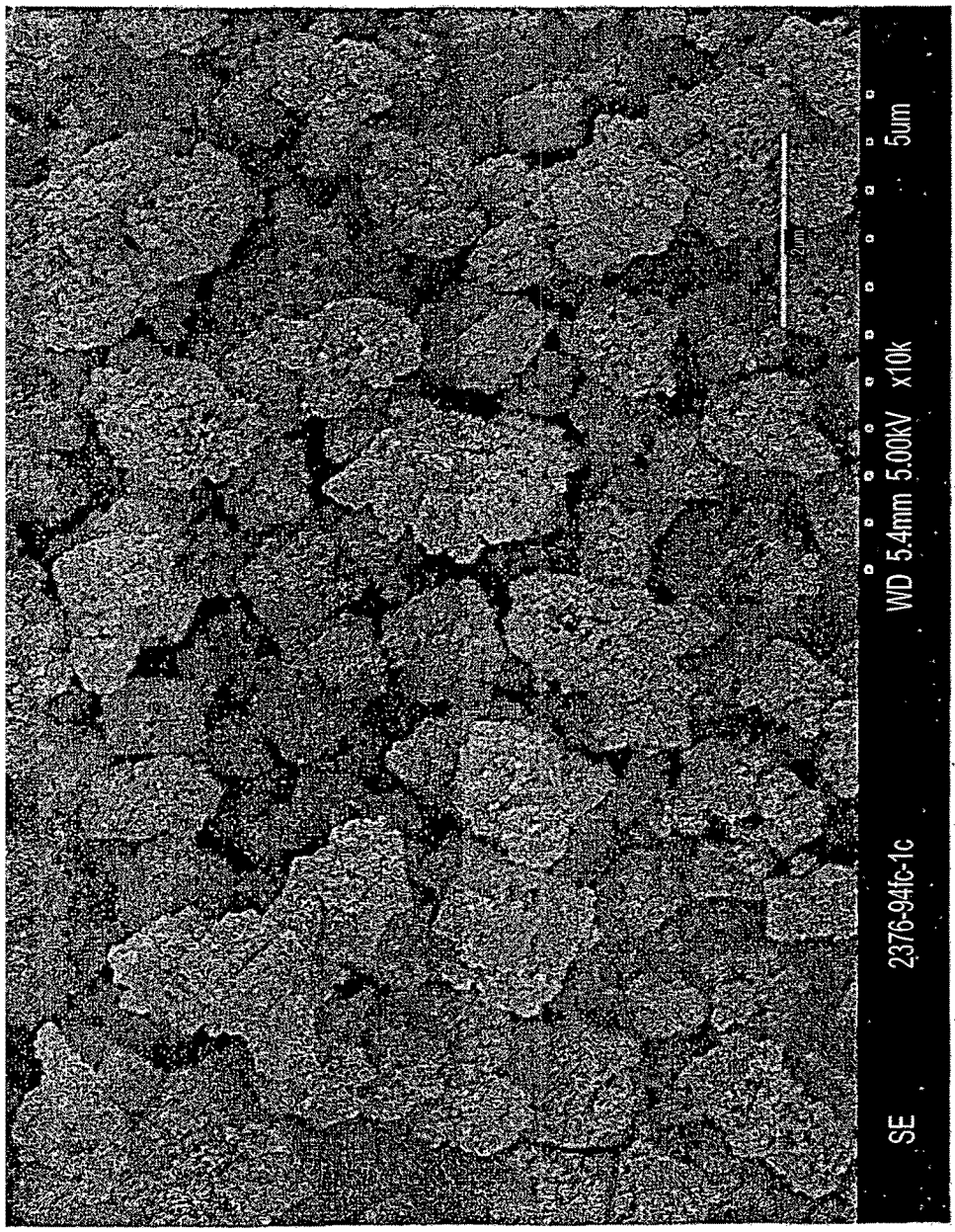
FIG. 1 is a SEM of the SAPO-34 material described in Example 1, before aging or cation-exchange.
Figure 2:
FIG. 2 is a SEM of the SAPO-34 material described in Example 2, before aging or cation-exchange.
Figure 3:
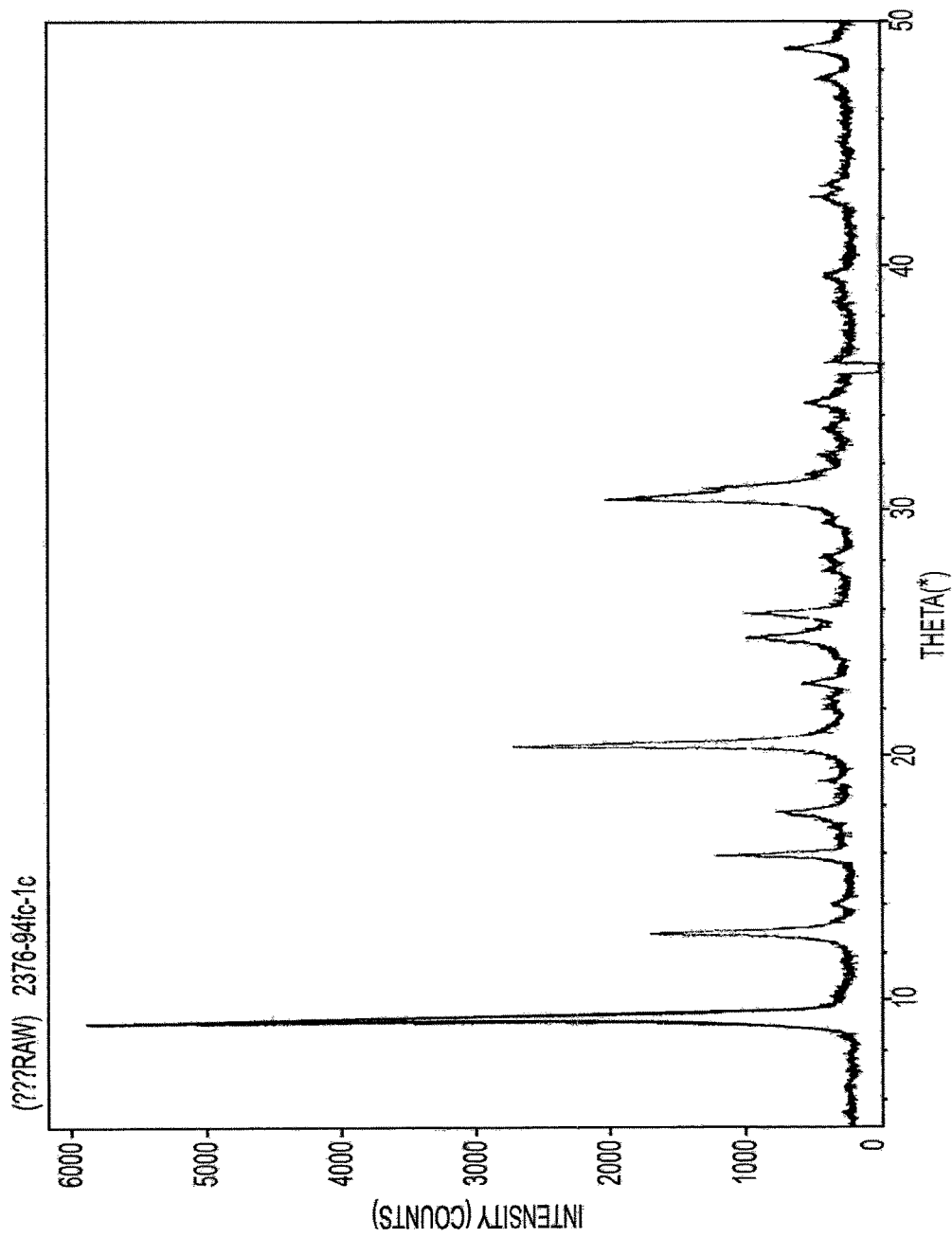
FIG. 3 is a XRD of the SAPO-34 material described in Example 1, before aging or cation-exchange.
Figure 4:
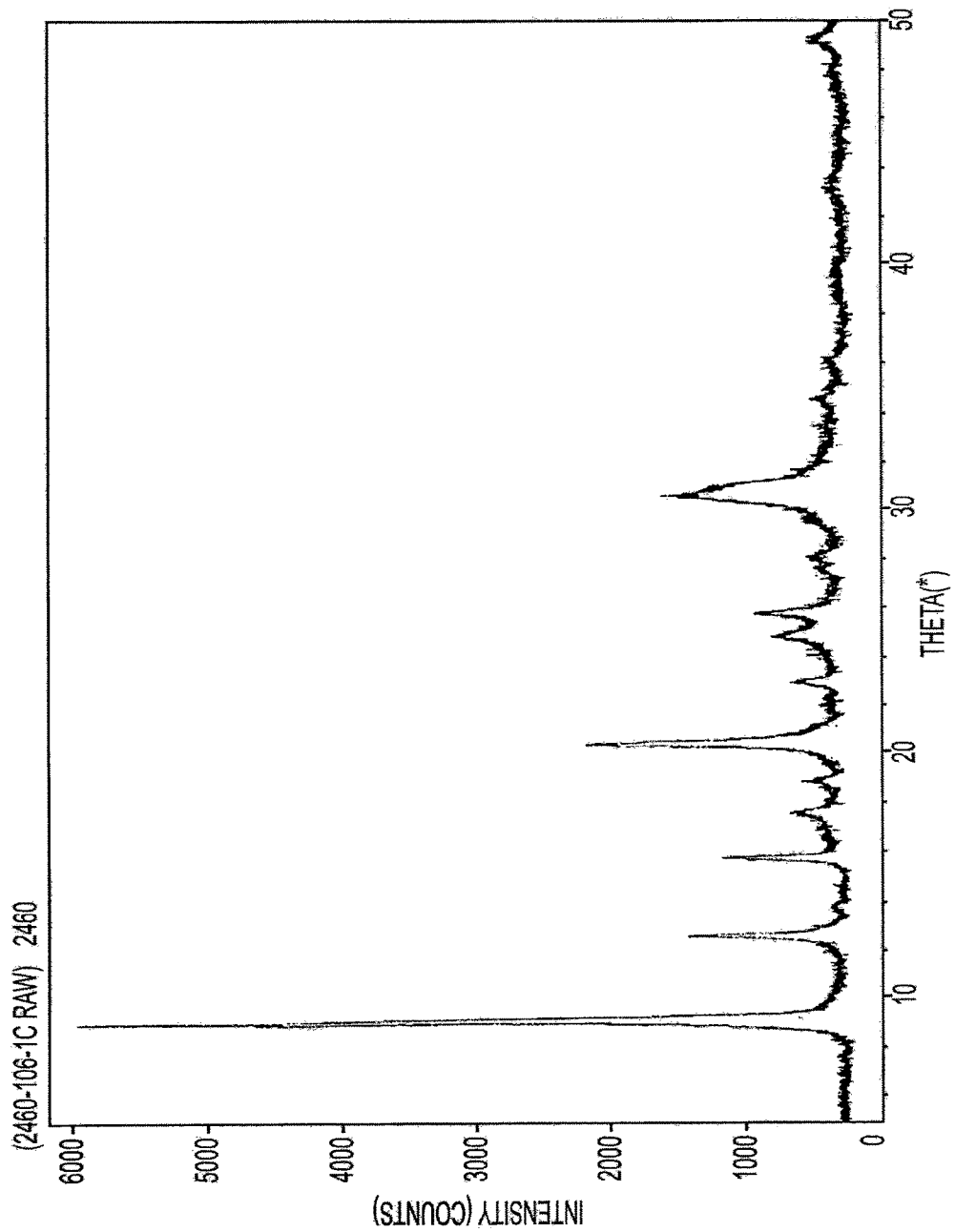
FIG. 4 is a XRD of the SAPO-34 material described in Example 2, before aging or cation-exchange.
Figure 5:
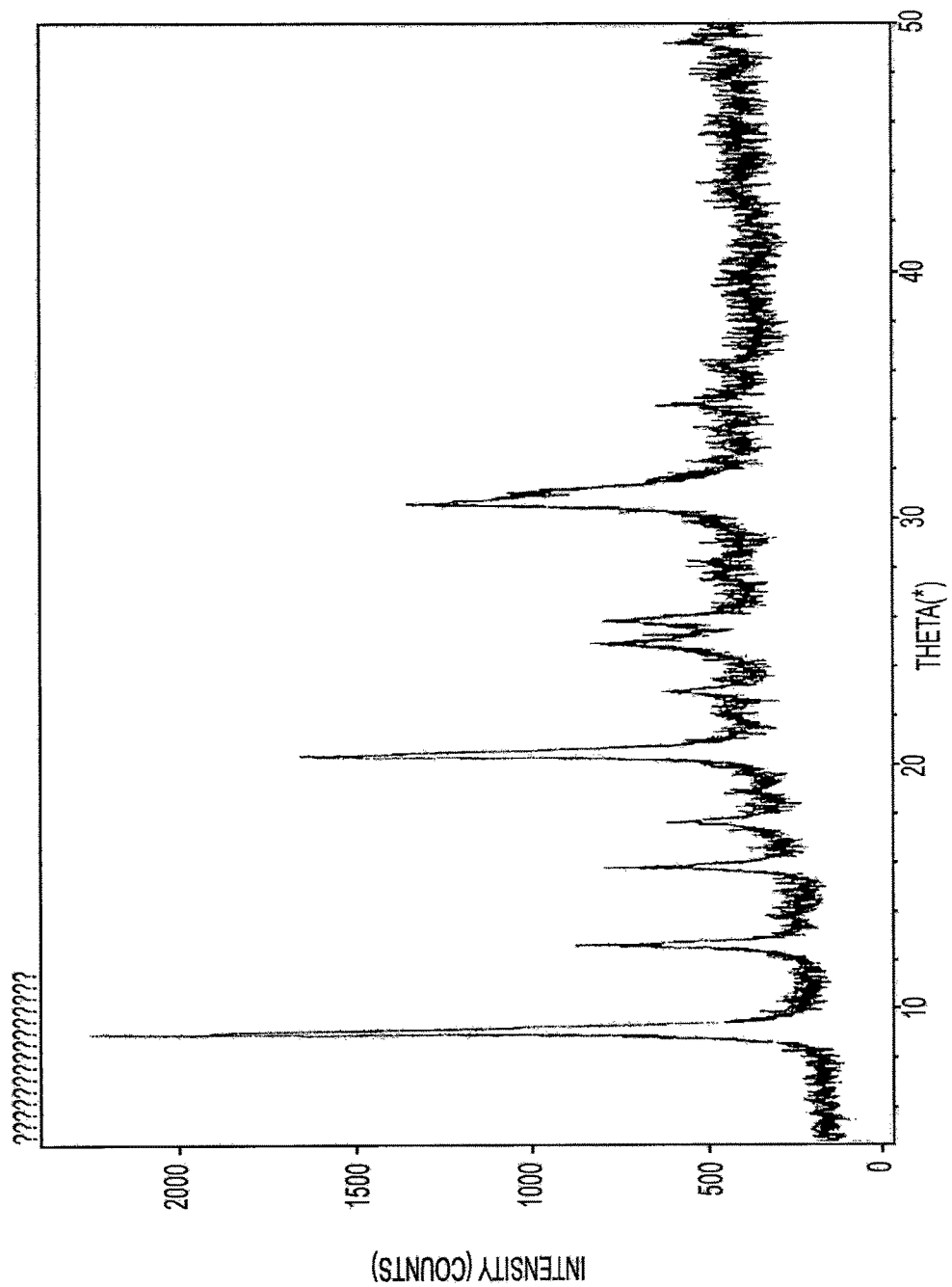
FIG. 5 is a XRD of the Cu-exchanged SAPO-34 material described in Example 1 after hydrothermal aging at 800° C.
Figure 6:
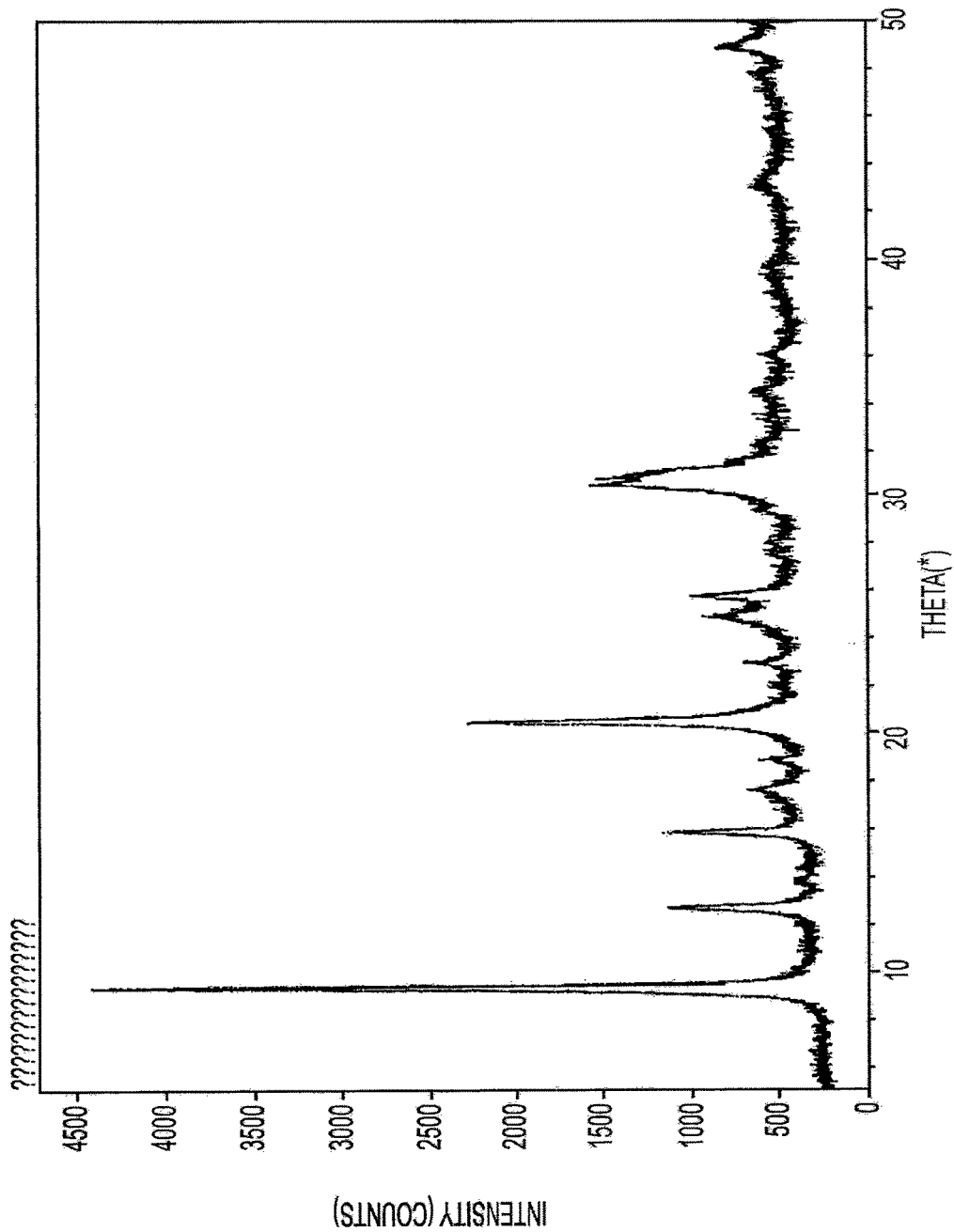
FIG. 6 is a XRD of the Cu-exchanged SAPO-34 material described in Example 2 after hydrothermal aging at 800° C.
Figure 7:
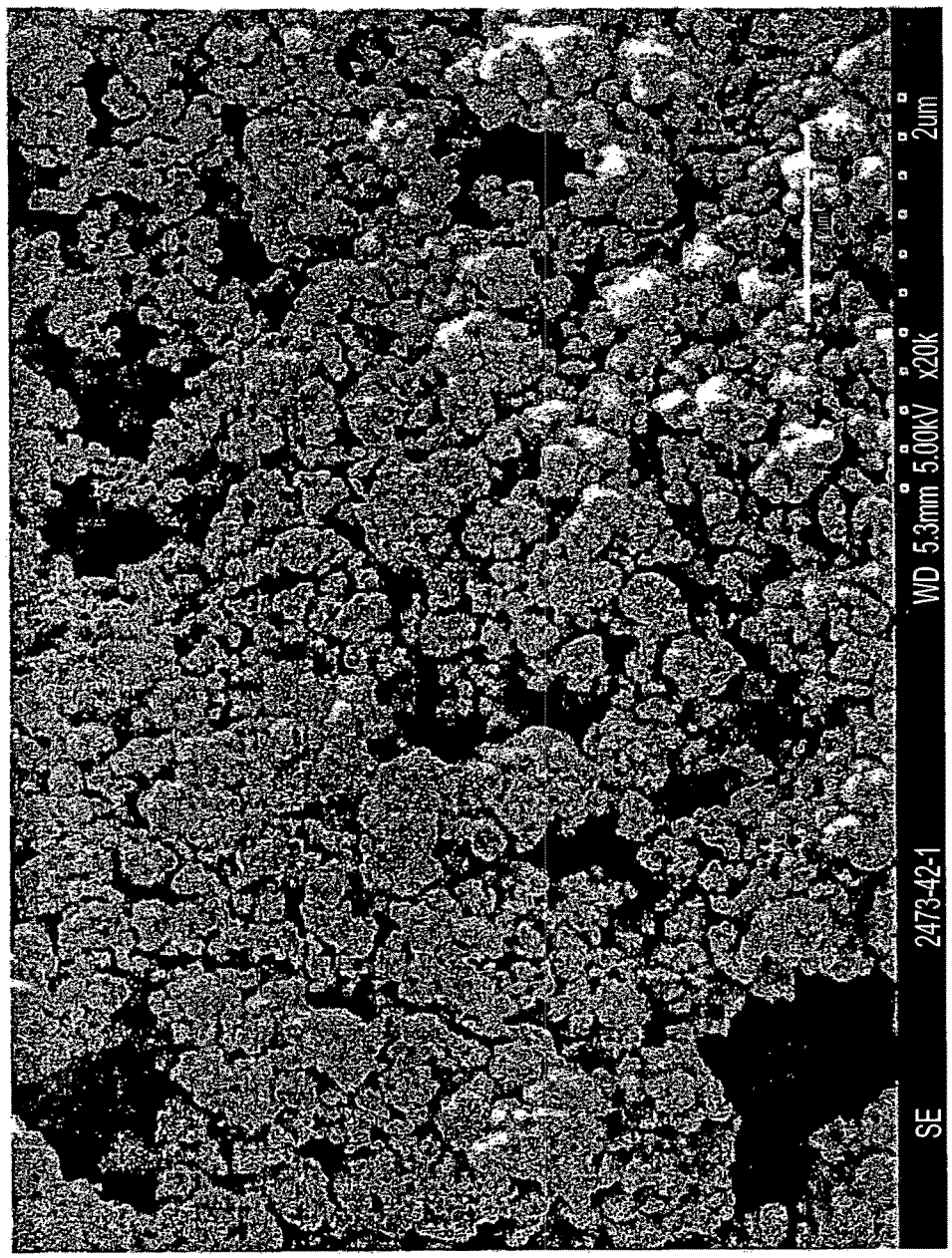
FIG. 7 is a SEM of the SAPO-34 material described in Comparative Example 2, before aging or cation-exchange.

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 80%, such as at least 85%, at least 90%, or even at least 95%, of its surface area and micropore volume after exposure to conditions simulating those present in an automobile exhaust, such as temperatures ranging up to 900° C. in the presence of up to 10 volume percent (vol %) water vapor for times ranging from up to 1 hour, or even up to 16 hours, such as for a time ranging from 1 to 16 hours.

"Initial Surface Area" means the surface area of the freshly made crystalline material before exposing it to any aging conditions.

"Initial Micropore Volume" means the micropore volume of the freshly made crystalline material before exposing it to any aging conditions.

"Direct synthesis" (or any version thereof) refers to a method that does not require a metal-doping process after the zeolite has been formed, such as a subsequent ion-exchange or impregnation method.

"Defined by the Structure Commission of the International Zeolite Association," is intended to mean those structures included but not limited to, the structures described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with ammonia) in the presence of oxygen to form nitrogen and $H_2O$.

"Exhaust gas" refers to any waste gas formed in an industrial process or operation and by internal combustion engines, such as from any form of motor vehicle.

DETAILED DESCRIPTION OF THE INVENTION

The microporous crystalline materials comprising a molecular sieve or zeolite having an 8-ring pore opening structure of the present invention exhibit good hydrothermal properties, as evidenced by the stability of the surface area and micropore volume after exposure to high temperatures and humidity. For example, after being treated at up to 900° C. in the presence of up to 10 vol % water vapor for a time ranging from 1 to 16 hours, the microporous crystalline materials of the present invention maintain at least 80% of their initial surface area. Likewise, after the treatment, the microporous crystalline materials of the present invention maintain at least 80% of their initial micropore volume.

There is disclosed a microporous crystalline material comprising a metal containing chabazite having a crystal size greater than 0.5 microns and a silica-to-alumina ratio (SAR) greater than 15, such as from 15-60, or even 20-60. In one embodiment, the metal containing chabazite retains at least 80% of its initial surface area and micropore volume after exposure to temperatures of up to 900° C. in the presence of up to 10 volume percent water vapor for up to 1 hour.

In one embodiment, the metal portion of the chabazite comprises copper or iron, which can be introduced into the chabazite in various ways, such as by liquid-phase or solid ion-exchange or incorporated by direct-synthesis. In one embodiment, the copper comprises at least 1.0 weight percent of the total weight of the material, such as a range from 1.0-4.0 weight percent of the total weight of the material.

As stated, the metal portion of the chabazite may comprises iron instead of or in addition to copper. In one embodiment, the iron comprises at least 0.2 weight percent of the total weight of the material, such as an amount ranging from 0.2-3.0 weight percent of the total weight of the material.

In one embodiment, metal containing chabazite material described herein has an initial surface area of at least 650 $m^2/g$ and an initial micropore volume of at least 0.25 cc/g. In addition, the crystal size of the metal containing chabazite may range from 0.5 to 5.0 microns.

In one embodiment, the microporous crystalline materials disclosed herein has an initial surface area of at least 650 $m^2/g$, such as at least 700 $m^2/g$, or even up to 800 $m^2/g$.

In addition, the microporous crystalline materials disclosed herein may have an initial micropore volume of at least 0.25 cc/g, such as 0.30 cc/g.

There is also disclosed a method of selective catalytic reduction (SCR) of NOx in exhaust gas. In one embodiment, the method comprises contacting, typically in the presence of ammonia or urea, exhaust gas with a metal containing chabazite as described herein. For example, the method comprises contacting exhaust gas with a metal containing chabazite having a crystal size greater than 0.5 microns and a silica-to-alumina ratio (SAR) greater than 15, such as from 15-60, or even 20-60. As mentioned, the metal containing chabazite typically retains at least 80% of its initial surface area and micropore volume after exposure to temperatures of up to 900° C. in the presence of up to 10 volume percent water vapor for up to 1 hour.

In another embodiment, there is disclosed a method of selective catalytic reduction (SCR) of $NO_x$ in exhaust gas, which comprises:

providing an article comprising a microporous crystalline material comprising a metal containing chabazite described herein, such as one having a crystal size greater than 0.5 microns and a silica-to-alumina ratio (SAR) greater than 15; and contacting the article with exhaust gas comprising $NO_R$. This step may be performed in presence of ammonia or urea.

The article described herein may be in the form of a channeled or honeycombed-shaped body; a packed bed; microspheres; or structural pieces. The packed bed comprises balls, pebbles, pellets, tablets, extrudates, other particles, or combinations thereof.

The structural pieces described herein may be in the form of plates or tubes.

In one embodiment, the channeled or honeycombed-shaped body or structural piece is formed by extruding a mixture comprising the chabazite molecular sieve.

In another embodiment, the channeled or honeycombed-shaped body or structural piece is formed by coating or depositing a mixture comprising the chabazite molecular sieve on a preformed substrate.

In another embodiment, the microporous crystalline materials of the present invention comprise molecular sieves or zeolites, including SAPO-34, high-silica chabazite, or those having a structure defined by the Structure Commission of the International Zeolite Association as CHA. The SAPO-34 structure described herein may contain $SiO_2$ in an amount ranging from 1-20% and may have a crystal size greater than 0.3 microns. In another embodiment, the high-silica chabazite of the present invention may have a silica-to-alumina ratio ("SAR") greater than 15, such as ranging from 15-60.

The microporous crystalline materials described herein may also comprise molecular sieves and aluminosilicate zeolites having an 8-ring pore opening structure defined by the Structure Commission of the International Zeolite Association chosen from: AEI, AFT, AFX, CHA, DDR, ERI, ITE, ITW, KFI, LEV, LTA, PAU, RHO, and UFI. These materials also exhibit the hydrothermal stability properties described herein, such as retaining at least 80% of their initial surface area and initial micropore volume after being treated at temperatures of up to 900° C. in the presence of up to 10 vol % water vapor for a time ranging from 1 to 16 hours. These materials may be an aluminosilicate having a SAR greater than 15, such as ranging from 20-60. Alternatively, these materials may also be SAPO molecular sieve structures containing $SiO_2$ in an amount ranging from 1-20%.

The high silica chabazite compositions of the present invention exhibit good hydrothermal and thermal properties as identified herein. For example, after being treated at temperatures up to 900° C. in the presence of up to 10 vol % water vapor for 16 hours, the inventive compositions maintain at least 80% of their initial surface area, such as at least 85%, at least 90%, or even at least 95%. Likewise, after the treatment, the inventive compositions maintain at least 80% of their initial micropore volume, such as 85%, and even 90% of their initial micropore volume.

The microporous crystalline materials of the present invention may comprise a metal, such as copper. In one embodiment, the copper is introduced into the microporous crystalline material by liquid-phase or solid ion-exchange or incorporated by direct-synthesis.

The present invention also is directed to hydrothermally stable microporous materials comprising a molecular sieve or zeolite having an 8-ring pore opening structure for SCR of $NO_x$ with urea or ammonia, wherein the microporous material comprises copper and retains at least 80% of its surface area and micropore volume after exposure to temperatures of up to 900° C. and up to 10% water for up to 1 hour. The copper may comprise at least 1.0 weight percent of the total weight of the material.

In SAPO-34 compositions resulting from iron cation exchange, iron oxide comprises at least 0.20 weight percent of the total weight of the composition, such as 0.25 weight percent, or even 0.30 weight percent. The resulting iron cation-exchanged SAPO-34 compositions have a surface area of at least 250 $m^2/g$, such as at least 400 $m^2/g$, and even at least 600 $m^2/g$.

In SAPO-34 compositions resulting from copper cation-exchange, copper oxide comprises at least 1.90 weight percent of the total weight of the composition, such as 1.95 weight percent, and even 2.00 weight percent. The resulting copper cation-exchanged SAPO-34 compositions have a surface area of at least 550 $m^2/g$, such as at least 600 $m^2/g$, and even at least 650 $m^2/g$.

The resulting cation-exchanged SAPO-34 compositions also exhibit good hydrothermal and thermal properties, as evidenced by the stability of the surface area after exposure to high temperatures and humidity. For example, after being treated at temperatures up to 900° C. in the presence of up to 10 vol % water vapor for up to 1 hour, the iron cation-exchanged SAPO-34 compositions of the present invention maintain at least 20% of their initial surface area, such as at least 40%, and even at least 60%.

The microporous crystalline materials of the present invention are useful as exhaust catalysts, such as for reduction of NO in automotive exhaust, in part because of their good thermal and hydrothermal stability. Under extreme conditions, automotive exhaust catalysts are exposed to heat up to and in excess of 900° C. Therefore, some automotive exhaust catalysts are required to be stable at temperatures up to and in excess of 900° C.

The present invention is also directed to a method for reduction, typically prior to discharge, of exhaust gas. As mentioned, reference to "exhaust gas" refers to any waste gas formed in an industrial process or operation and by internal combustion engines, the composition of which varies. Non-limiting examples of the types of exhaust gases that may be treated with the disclosed materials include both automotive exhaust, as well as exhaust from stationary sources, such as power plants, stationary diesel engines, and coal-fired plants.

For example, the present invention is directed to a method for SCR of exhaust gases contaminated with $NO_N$. The nitrogen oxides of exhaust gases are commonly NO and $NO_2$; however, the present invention is directed to reduction of the class of nitrogen oxides identified as $NO_R$. Nitrogen oxides in exhaust are reduced with ammonia to form nitrogen and water. As previously mentioned, the reduction can be catalyzed to preferentially promote the reduction of the $NO_x$ over the oxidation of ammonia by the oxygen, hence "selective catalytic reduction."

The inventive method for SCR of $NO_x$ in exhaust gases comprises contacting, in the presence of ammonia or urea, exhaust gas with a hydrothermally stable microporous crystalline material comprising a molecular sieve or zeolite having an 8-ring pore opening structure, wherein the crystalline material retains at least 80% of its surface area and micropore volume after exposure to temperatures of up to 900° C. in the presence of up to 10 vol % water vapor for a time ranging from 1 to 16 hours. In one embodiment, the molecular sieves and zeolites having an 8-ring pore opening structure comprising the microporous crystalline material may be chosen from those structures defined by the Structure Commission of the International Zeolite Association as AEI, AFT, AFX, CHA, DDR, ERI, ITE, ITW, KFI, LEV, LTA, PAU, RHO, and UFI.

One inventive method of SCR of $NO_x$ in exhaust gas also comprises contacting, in the presence of ammonia or urea, exhaust gas with a hydrothermally stable microporous material comprising a molecular sieve or zeolite, such as a high silica chabazite or other material having an 8-ring pore opening structure, wherein the microporous material comprises metal and retains at least 80% of its surface area and micropore volume after exposure to temperatures of up to 900° C. in the presence of up to 10 vol % water vapor for up to 1 hour.

In one embodiment, the inventive method for SCR of exhaust gases may comprise (1) adding ammonia or urea to the exhaust gas to form a gas mixture; and (2) contacting the gas mixture with a microporous crystalline composition comprising SAPO-34, having an initial surface area of at least 650 m²/g, wherein the surface area, after being treated at 700-900° C. in the presence of up to 10 vol % water vapor for a time ranging from 1 to 16 hours, is at least 80% of the initial surface area; such that the $NO_x$ and ammonia of the gas mixture is converted to nitrogen and water. In one embodiment, the $NO_x$ of the exhaust gas are substantially converted.

The inventive method may be performed using a microporous crystalline composition comprising SAPO-34 that has been cation exchanged with iron, wherein iron oxide is at least 0.20 weight percent of the total weight of the microporous crystalline composition, and wherein the SAPO-34 has an initial surface area of at least 250 m²/g, and wherein the surface area, after being treated at temperatures up to 900° C. in the presence of up to 10 vol % water vapor for up to 1 hour, is at least 10% of the initial surface area. Likewise, the inventive method may also be performed using a microporous crystalline composition comprising SAPO-34 cation exchanged with copper, wherein copper oxide is at least 1.0 weight percent of the total weight of the microporous crystalline composition, and wherein the SAPO-34 has an initial surface area of at least 500 m²/g, and wherein the surface area, after being treated at temperatures of up to 900° C. in the presence of up to 10 vol % water vapor for up to 1 hour, is at least 80% of the initial surface area.

It has been found that such methods result in the substantial conversion of $NO_x$ and ammonia of the gas mixture to nitrogen and water. The microporous crystalline materials of the present invention show surprisingly high stability and high reduction of NO activity over large pore zeolites.

The microporous crystalline materials of the present invention, including SAPO-34, may also be useful in the conversion of oxygenate-containing feedstock into one or more olefins in a reactor system. In particular, the compositions may be used to convert methanol to olefins.

There is also disclosed a method of making the crystalline material according to the present invention. In one embodiment, this includes mixing together an organic structural directing agent, such as a tetraethylammonium hydroxide solution (e.g., 35% TEAOH), a precursor of aluminum (e.g., pseudoboehmite alumina), and de-ionized water. To such a mixture, other known ingredients, including a source of iron or copper, if desired, and silica sol can be added while stirring, to form a gel. Crystallization seeds, such as a particular zeolite, may be added to the gel to form a desired molar composition.

The gel can then be heated in an autoclave for a time and temperature to provide a substantially pure phase composition after cooling, washing, and filtering the product. As one skilled in the art would appreciate, the product can achieve a desired SAR and/or remove organic residue upon calcination.

The present invention is also directed to a catalyst composition comprising the microporous crystalline material described herein. The catalyst composition may also be cation-exchanged, particularly with iron or copper.

In one embodiment, the present invention is directed to a catalyst composition comprising a microporous crystalline composition comprising SAPO-34 having an initial surface area of at least 650 m²/g, wherein the surface area, after being treated at temperatures of up to 900° C. in the presence of up to 10 vol % water vapor for up to 16 hours, is at least 80% of the initial surface area and a matrix material. In another aspect of the invention, the catalyst composition may comprise a cation-exchanged SAPO-34 composition, particularly with iron or copper.

Any suitable physical form of the catalyst may be utilized, including, but not limited to: a channeled or honeycombed-type body; a packed bed of balls, pebbles, pellets, tablets, extrudates or other particles; microspheres; and structural pieces, such as plates or tubes.

The invention will be further clarified by the following non-limiting examples, which are intended to be purely exemplary of the invention.

EXAMPLES

Example 1 (SAPO 34—Medium, Non-Uniform Crystals)

Pseudoboehmite alumina, phosphoric acid, silica sol (Ludox LS30), TEAOH solution, and deionized water were mixed together to form a gel. The gel was stirred at room temperature for about 30 min before charged to an autoclave. The autoclave was heated to 150° C. and maintained at the temperature for 60 hours. After cooling, the product was recovered by filtration and washed with deionized water. The product was then dried and calcined to remove any organic residue. The resulting product was medium, non-uniform crystals. The resulting properties are listed below in Table 1.

Example 2 (SAPO-34—Large, Uniform Crystals)

Pseudoboehmite alumina, phosphoric acid, silica sol (Nyacol 20₄O NH₄), TEAOH solution, and deionized water were mixed together to form a gel. The gel was stirred at room temperature for about 30 min before charged to an autoclave. The autoclave was heated to 180° C. and maintained at the temperature for 12 hours. After cooling, the product was recovered by filtration and washed with deionized water. The product was then dried and calcined to remove organic. The resulting product was large, uniform crystals. The resulting properties are listed below in Table 1.

Example 3 (High-Silica Chabazite)

High-silica chabazite (structure code CHA) was synthesized according to examples in U.S. Pat. No. 4,544,538, which is herein incorporated by reference. In particular, NaOH, de-ionized water, N,N,N-Trimethyl-1-adamantammonium hydroxide (R) solution, and aluminum hydroxide (Reheis F-2000) were mixed together to form a solution. Silica gel (PQ Corporation) was added to the solution to form a synthesis gel with the following molar composition:

The synthesis gel was loaded in an autoclave and crystallization was conducted at 160° C. for 96 hours with agitation. After filtering, washing, and drying, the product showed pure chabazite structure by XRD. The product was calcined at 550° C. for 10 hours to remove residual organic. To remove residual sodium, the calcined product was slurried in 2 liters of 2 M NH₄NO₃ solution and stirred at 80° C. for 2 hours. The NH₄-form product was then ion-exchange with Cu(NO₃)₂ solution.

The resulting properties are listed below in Table 1.

Figure 8:
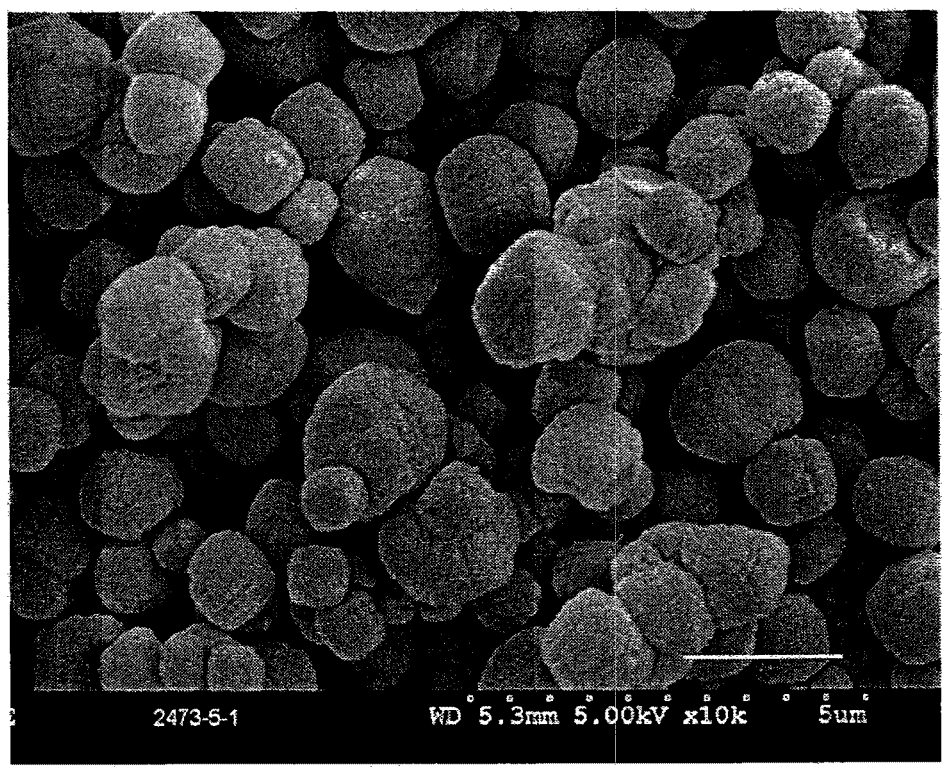
FIG. 8 is an SEM of a large crystal, high-silica chabazite described in Inventive Example 3.

In addition, FIG. 8 is an SEM showing the large crystal size associated with this Example.

Example 4 (SAPO-18)

SAPO-18 (structure code AEI) was synthesized according to the procedure outlined in J. Chen et al., Catal. Lett. 28

(1994) 241, which is herein incorporated by reference. Pseudoboehmite alumina, phosphoric acid, silica sol, N,N-diisopropylethylamine (DIPEA), and deionized water were mixed to form a gel. The gel was stirred at room temperature for 120 min before being charged to an autoclave. The autoclave was heated to 190° C. and maintained at this temperature for 48 hours. After cooling, the product was recovered by filtration and washed with deionized water. The product was then dried and calcined at 550° C. to remove organic. The resulting properties are listed below in Table 1.

Comparative Example 1 (Low-Silica Chabazite)

Low-silica chabazite (structure code CHA) was synthesized according to examples of U.S. Pat. No. 5,026,532, which is herein incorporated by reference. After filtering, washing, and drying, the product was calcined at 550° C. To remove residual sodium and potassium, the product was then washed in a solution containing 0.25 M $HNO_3$ and 4 M $NH_4NO_3$ at 80° C. for 2 hours. The resulting properties are listed below in Table 1.

Comparative Example 2 (SAPO 34—Small, Non-Uniform Crystals))

Al isopropoxide, phosphoric acid, tetraethyl orthosilicate, TEAOH solution, and deionized water were mixed together to form a gel with the following composition:

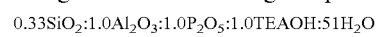

$0.33SiO_2:1.0Al_2O_3:1.0P_2O_5:1.0TEAOH:51H_2O$

The gel was stirred at room temperature for about 30 min before charged to an autoclave. The autoclave was heated to 180° C. and maintained at the temperature for 12 hours. After cooling, the product was recovered by filtration and washed with deionized water. The product was then dried and calcined to remove any organic. The resulting product was small crystals (less than 0.2 micron in size). The resulting properties are listed below in Table 1.

TABLE 1

| | Example 1 | Example 2 | Example 3 | Example 4 | Comp. Ex. 1 | Comp. Ex. 2 |
|---|---|---|---|---|---|---|
| Gel Composition | 0.4 $SiO_2$:1.0 $Al_2O_3$:1.0 $P_2O_5$:1.0 TEA | 0.6 $SiO_2$:1.0 $Al_2O_3$:1.0 $P_2O_5$:0.7 TEA | | 0.6 $SiO_2$:1.0 $Al_2O_3$:0.9 $P_2O_5$:1.6 DIPEA | | 0.33 $SiO_2$:1.0 $Al_2O_3$:1.0 $P_2O_5$:1.0 TEA |
| | | | Fresh Crystals | | | |
| $SiO_2/Al_2O_3$ molar ratio (SAR) | | | 28 | | 6.3 | |
| Surface area (m2/g) | 677 | 745 | 798 | 696 | 577 | 566 |
| Micropore volume (cc/g) | 0.27 | 0.29 | 0.30 | 0.25 | 0.21 | 0.18 |
| Acidity (mmol/g) | 1.00 | 1.00 | 0.75 | | 1.54 | 0.72 |
| | | After 900° C. 10 vol % water 16 hr aging | | | | |
| Surface area (m²/g) | 607 | 698 | 663 | | | 409 |
| Micropore volume (cc/g) | 0.22 | 0.27 | 0.24 | | | 0.13 |
| Acidity (mmol/g) | 0.40 | 0.57 | 0.05 | | | 0.01 |
| | | | Fe Ion-exchange | | | |
| $Fe_2O_3$ wt % | 0.32 | 0.27 | 1.4 | | | |
| Surface area (m²/g) | 306 | 686 | 793 | | | |
| | | After 900° C. 10 vol % water 16 hr aging | | | | |
| Surface area (m²/g) | 39 | 444 | 780 | | | |
| $NO_x$ Conversion (%) at 300° C. | 10.7 | 10.2 | 88.7 | | | |
| $NO_x$ Conversion (%) at 400° C. | 25.8 | 35.3 | 90.4 | | | |
| | | | Cu Ion-exchange | | | |
| CuO wt % | 2.08 | 1.97 | 2.2 | 1.8 | 2.0 | |
| Surface area (m²/g) | 558 | 681 | 747 | 669 | 557 | |
| | | After 900° C. 10 vol % water 16 hr aging | | | | |
| Surface area (m²/g) | 13 | 4 | 669 | | | |
| | | After 700° C. 10 vol % water 16 hr aging | | | | |
| Surface area (m²/g) | 544 | 683 | 762 | 639 | 10 | |

Hydrothermal Aging Tests

The foregoing samples were hydrothermally aged at temperatures ranging from 700-900° C. in the presence of 10 vol % water vapor for between 1 and 16 hours to simulate automotive exhaust aging conditions. The activities of the hydrothermally aged materials for $NO_x$ conversion, using $NH_3$ as reductant, were tested with a flow-through type reactor. Powder zeolite samples were pressed and sieved to 35/70 mesh and loaded into a quartz tube reactor. The gas stream conditions are set forth in Table 2. Reactor temperature was ramped and NO conversion was determined with an infrared analyzer at each temperature interval. The results are set forth in Table 2 below.

TABLE 2

Ion-exchange with Cu and $NO_x$ reduction with $NH_3$

| | Example 1 | Example 2 | Example 3 | Example 4 |
|---|---|---|---|---|
| After 700° C., 10 vol % water vapor, 16 hr aging | | | | |
| Surface area (m²/g) | 544 | 683 | 762 | 639 |
| $NO_x$ Conversion at 200° C.* | | | 97.6 | 92.0 |
| $NO_x$ Conversion at 250° C.* | 91.2 | 92.2 | | |
| $NO_x$ Conversion at 300° C.* | 91.3 | 91.8 | 97.9 | 94.2 |
| $NO_x$ Conversion at 400° C.* | 90.5 | 92.8 | 93.7 | 90.6 |
| After 800° C., 10 vol % water vapor, 16 hr aging | | | | |
| Surface area (m²/g) | 517 | 657 | | |
| $NO_x$ Conversion at 250° C.** | 84.7 | 89.8 | | |
| $NO_x$ Conversion at 300° C.** | 88.9 | 91.3 | | |
| $NO_x$ Conversion at 400° C.** | 88.0 | 86.3 | | |
| After 900° C., 10 vol % water vapor, 1 hr aging | | | | |
| Surface area (m²/g) | | 632 | 669 | |
| $NO_x$ Conversion at 200° C.*** | | | 83.1 | 90.7 |
| $NO_x$ Conversion at 300° C.*** | | | 90.6 | 86.9 |
| $NO_x$ Conversion at 400° C.*** | | | 83.1 | 79.9 |

*$NH_3$-SCR of $NO_x$ reaction conditions: 500 ppm $NO_x$; $NH_3/NO$ = 1.0; 5 vol % $O_2$; balance $N_2$; SV = 50,000 $h^{-1}$
**$NH_3$-SCR of $NO_x$ reaction conditions: 500 ppm $NO_x$; $NH_3/NO$ = 1.0; 5 vol % $O_2$; balance $N_2$; SV = 100,000 $h^{-1}$
***$NH_3$-SCR of $NO_x$ reaction conditions: 500 ppm NO; $NH_3/NO$ = 1.0; 5 vol % $O_2$; balance $N_2$; SV = 50,000 $h^{-1}$ Comparative Example 3: Small Crystal, High Silica Chabazite An additional comparative example comprising a small crystal, high silica chabazite material was prepared as follows:

NaOH, de-ionized water, N,N,N-Trimethyl-1-adamantammonium hydroxide (R) solution, and aluminum hydroxide were mixed together to form a solution. Precipitated silica (PPG Hi-Sil® 233) was added to the solution to form a synthesis gel with the following molar composition:

$35SiO_2:1.0Al_2O_3:2.8Na_2O:2.5R:420H_2O$

About 1 wt. % high-silica chabazite (based on total alumina and silica) was added to the above gel as crystallization seeds. The final synthesis gel was loaded in an autoclave and crystallization was conducted at 160° C. for 48 hours with agitation. After filtering, washing, and drying, the product showed pure chabazite structure by XRD. The product was calcined at 550° C. for 10 hours to remove residual organic. To remove residual sodium, the calcined product was slurried in 2 liters of 2 M $NH_4NO_3$ solution and stirred at 80° C. for 2 hours. The $NH_4$-form product was then ion-exchange with $Cu(NO_3)_2$ solution.

Figure 9:
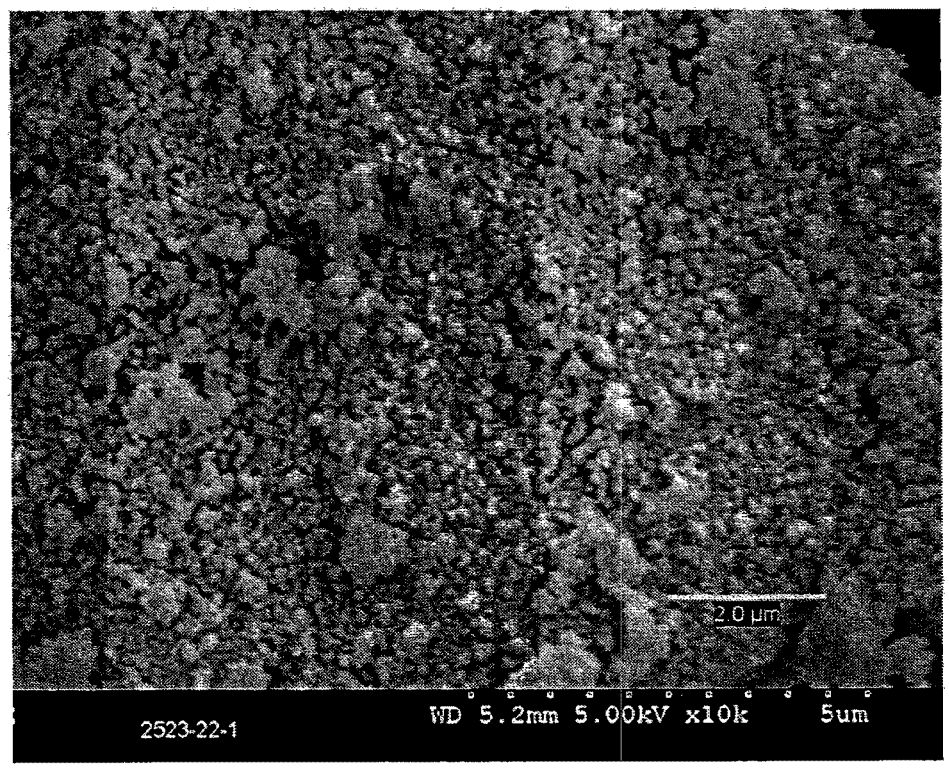
FIG. 9 is an SEM of a small crystal, high-silica chabazite, described in Comparative Example 3.

FIG. 9 is an SEM showing the microstructure associated with this comparative sample. The hydrothermal stability properties of this comparative example were compared to the properties of inventive Example 3, as well as comparative Example 1. A summary of those results is provided in Table 3.

TABLE 3

| | Example 3: Large crystal high-silica chabazite | Comparative Example 1: Low-silica chabazite | Comparative Example 3: Small crystal high-silica chabazite |
|---|---|---|---|
| Fresh Zeolite | | | |
| $SiO_2/Al_2O_3$ molar ratio (SAR) | 28 | 6.3 | 27.5 |
| Surface area (m 2/g) | 798 | 577 | 742 |
| Micropore volume (cc/g) | 0.30 | 0.21 | 0.26 |
| After 900° C. 10% steam 16 hr aging | | | |
| Surface area (m²/g) | 663 | | 414 |
| Micropore volume (cc/g) | 0.24 | | 0.14 |
| Cu-exchanged Zeolite | | | |
| CuO wt % | 2.2 | 2.0 | 2.0 |
| Surface area (m²/g) | 747 | 557 | 732 |
| After 700° C. 10% steam 16 hr aging | | | |
| Surface area (m²/g) | 762 | 10 | |
| After 900° C. 10% steam 1 hr aging | | | |
| Surface area (m²/g) | 669 | | 611 |
| $NH_3$-SCR of NOx after 900° C. 10% steam 1 hr aging (Cu-exchanged zeolite) | | | |
| NOx Conversion (%) at 150° C.*** | 38.5 | | 16.9 |
| NOx Conversion (%) at 200° C.*** | 90.7 | | 83.0 |
| NOx Conversion (%) at 300° C.*** | 86.9 | | 89.9 |
| NOx Conversion (%) at 400° C.*** | 79.9 | | 61.8 |

***$NH_3$-SCR of NOx reaction conditions: 500 ppm NO; $NH_3/NO$ = 1.0; 5 vol % O2; balance N2; SV = 50,000 h – 1.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with the true scope of the invention being indicated by the following claims.

What we claim is:

1. A zeolitic material comprising a copper containing chabazite having a crystal size greater than 0.5 microns and a silica-to-alumina ratio (SAR) greater than 15, wherein said copper containing chabazite retains at least 80% of its initial surface area and micropore volume after exposure to temperatures of up to 900° C. in the presence of up to 10 volume percent water vapor for up to 1 hour.

2. A zeolitic material of claim 1, wherein said copper containing chabazite has a SAR ranging from 15-60.

3. A zeolitic material of claim 2, wherein said SAR ranges from 20-60.

4. A zeolitic material of claim 1, wherein said copper is introduced by liquid-phase or solid ion-exchange or incorporated by direct-synthesis.

5. A zeolitic material of claim 1, wherein said copper comprises at least 1.0 weight percent of the total weight of said material.

6. A zeolitic material of claim 5, wherein said copper comprises an amount ranging from 1.0 to 4.0 weight percent of the total weight of said material.

7. A zeolitic material of claim 1, wherein said initial surface area of said copper containing chabazite is at least 650 m²/g.

8. A zeolitic material of claim 1, wherein said initial micropore volume of said copper containing chabazite is at least 0.25 cc/g.

9. A zeolitic material of claim 1, wherein said crystal size of said copper containing chabazite ranges from 0.5 to 5.0 microns.

10. A method of selective catalytic reduction (SCR) of NOx in exhaust gas, said method comprising:
contacting exhaust gas with a zeolitic material comprising a copper containing chabazite having a crystal size greater than 0.5 microns and a silica-to-alumina ratio (SAR) greater than 15, wherein said copper containing chabazite retains at least 80% of its initial surface area and micropore volume after exposure to temperatures of up to 900° C. in the presence of up to 10 volume percent water vapor for up to 1 hour.

11. The method of claim 10, wherein said contacting step is performed in the presence of ammonia or urea.

12. The method of claim 10, wherein said chabazite has a SAR ranging from 15-60.

13. The method of claim 12, wherein said SAR ranges from 20-60.

14. The method of claim 1, wherein said copper is introduced by liquid-phase or solid ion-exchange or incorporated by direct-synthesis.

15. The method of claim 1, wherein said copper comprises at least 1.0 weight percent of the total weight of said material.

16. The method of claim 15, wherein said copper comprises an amount ranging from 1.0 to 4.0 weight percent of the total weight of said material.

17. The method of claim 10, wherein said initial surface area of said copper containing chabazite is at least 650 m²/g.

18. The method of claim 10, wherein said initial micropore volume of said metal containing chabazite is at least 0.25 cc/g.

19. The method of claim 10, wherein said crystal size of said copper containing chabazite ranges from 0.5 to 5.0 microns.

20. A method of selective catalytic reduction (SCR) of $NO_x$ in exhaust gas, said method comprising:
providing an article comprising a zeolitic material comprising a copper containing chabazite having a crystal size greater than 0.5 microns and a silica-to-alumina ratio (SAR) greater than 15; and
contacting said article with exhaust gas comprising $NO_x$, wherein said copper containing chabazite retains at least 80% of its initial surface area and micropore volume after exposure to temperatures of up to 900° C. in the presence of up to 10 volume percent water vapor for up to 1 hour.

21. The method of claim 20, wherein said contacting step is performed in the presence of ammonia or urea.

22. The method of claim 20, wherein said chabazite has a SAR ranging from 15-60.

23. The method of claim 22, wherein said SAR ranges from 20-60.

24. The method of claim 20, wherein said copper is introduced by liquid-phase or solid ion-exchange or incorporated by direct-synthesis.

25. The method of claim 20, wherein said copper comprises at least 1.0 weight percent of the total weight of said material.

26. The method of claim 25, wherein said copper comprises an amount ranging from 1.0 to 4.0 weight percent of the total weight of said material.

27. The method of claim 20, wherein said initial surface area of said copper containing chabazite is at least 650 m²/g.

28. The method of claim 20, wherein said initial micropore volume of said copper containing chabazite is at least 0.25 cc/g.

29. The method of claim 20, wherein said crystal size of said copper containing chabazite ranges from 0.5 to 5.0 microns.

30. The method of claim 20, wherein said article is in the form of a channeled or honeycombed-shaped body; a packed bed; microspheres; or structural pieces.

31. The method of claim 20, wherein said packed bed comprises balls, pebbles, pellets, tablets, extrudates, other particles, or combinations thereof.

32. The method of claim 30, where said structural pieces are in the form of plates or tubes.

33. The method of claim 30, wherein the channeled or honeycombed-shaped body or structural piece is formed by extruding a mixture comprising the chabazite molecular sieve.

34. The method of claim 30, wherein the channeled or honeycombed-shaped body or structural piece is formed by coating or depositing a mixture comprising the chabazite molecular sieve on a preformed substrate.

* * * * *